US008784720B2

(12) United States Patent
Oberhofer et al.

(10) Patent No.: US 8,784,720 B2
(45) Date of Patent: Jul. 22, 2014

(54) METHOD AND DEVICE FOR MANUFACTURING A THREE-DIMENSIONAL OBJECT THAT IS SUITABLE FOR APPLICATION TO MICROTECHNOLOGY

(75) Inventors: Johann Oberhofer, Stockdorf (DE); Joachim Göbner, Bürgel (DE); Hans-Ulrich Büse, Paderborn (DE)

(73) Assignee: EOS GmbH Electro Optical Systems, Krailling (DE)

( * ) Notice: Subject to any disclaimer, the term of this patent is extended or adjusted under 35 U.S.C. 154(b) by 370 days.

(21) Appl. No.: 13/032,283

(22) Filed: Feb. 22, 2011

(65) Prior Publication Data
US 2011/0221099 A1 Sep. 15, 2011

(30) Foreign Application Priority Data
Feb. 23, 2010 (DE) .......... 10 2010 008 960

(51) Int. Cl.
*B29C 35/08* (2006.01)
*B29C 41/02* (2006.01)
*B29C 67/00* (2006.01)
(52) U.S. Cl.
CPC ......... *B29C 67/0066* (2013.01); *B29C 67/0077* (2013.01)
USPC ................. 264/401; 219/121.66; 219/121.85; 264/482; 264/497
(58) Field of Classification Search
USPC ........ 264/401, 482, 497; 219/121.65, 121.66, 219/121.76, 121.85
See application file for complete search history.

(56) References Cited

U.S. PATENT DOCUMENTS

| | | | |
|---|---|---|---|
| 3,588,440 A * | 6/1971 | Morse ...................... | 219/121.65 |
| 5,597,589 A | 1/1997 | Deckard | |
| 5,997,795 A * | 12/1999 | Danforth et al. .............. | 264/401 |
| 7,537,664 B2 * | 5/2009 | O'Neill et al. ................ | 148/525 |
| 2003/0074096 A1 | 4/2003 | Das et al. | |
| 2004/0077745 A1* | 4/2004 | Xu ............................ | 264/401 X |
| 2006/0119012 A1* | 6/2006 | Ruatta et al. .................. | 264/497 |
| 2008/0029152 A1* | 2/2008 | Milshtein et al. ............. | 136/252 |
| 2010/0047743 A1* | 2/2010 | Brodkin et al. ............ | 433/222.1 |

FOREIGN PATENT DOCUMENTS

WO    WO-2007/147221    12/2007

OTHER PUBLICATIONS

Regenfuss et al., "Industrial freeform generation of microtools by laser micro sintering", Rapid Prototyping Journal 11/1 (2005) 18-25.

* cited by examiner

*Primary Examiner* — Leo B Tentoni
(74) *Attorney, Agent, or Firm* — Edwards Wildman Palmer LLP

(57) ABSTRACT

The present invention relates to a method and a device for manufacturing a three-dimensional object, wherein the object is generated by successively solidifying single layers of fluid or powdery solidifiable building material by the action of electromagnetic radiation. The method comprises steps for emitting a first pulsed electromagnetic radiation onto a first area of a layer of the building material, and for emitting a second continuous electromagnetic radiation onto a second area of the layer of the building material.

14 Claims, 1 Drawing Sheet

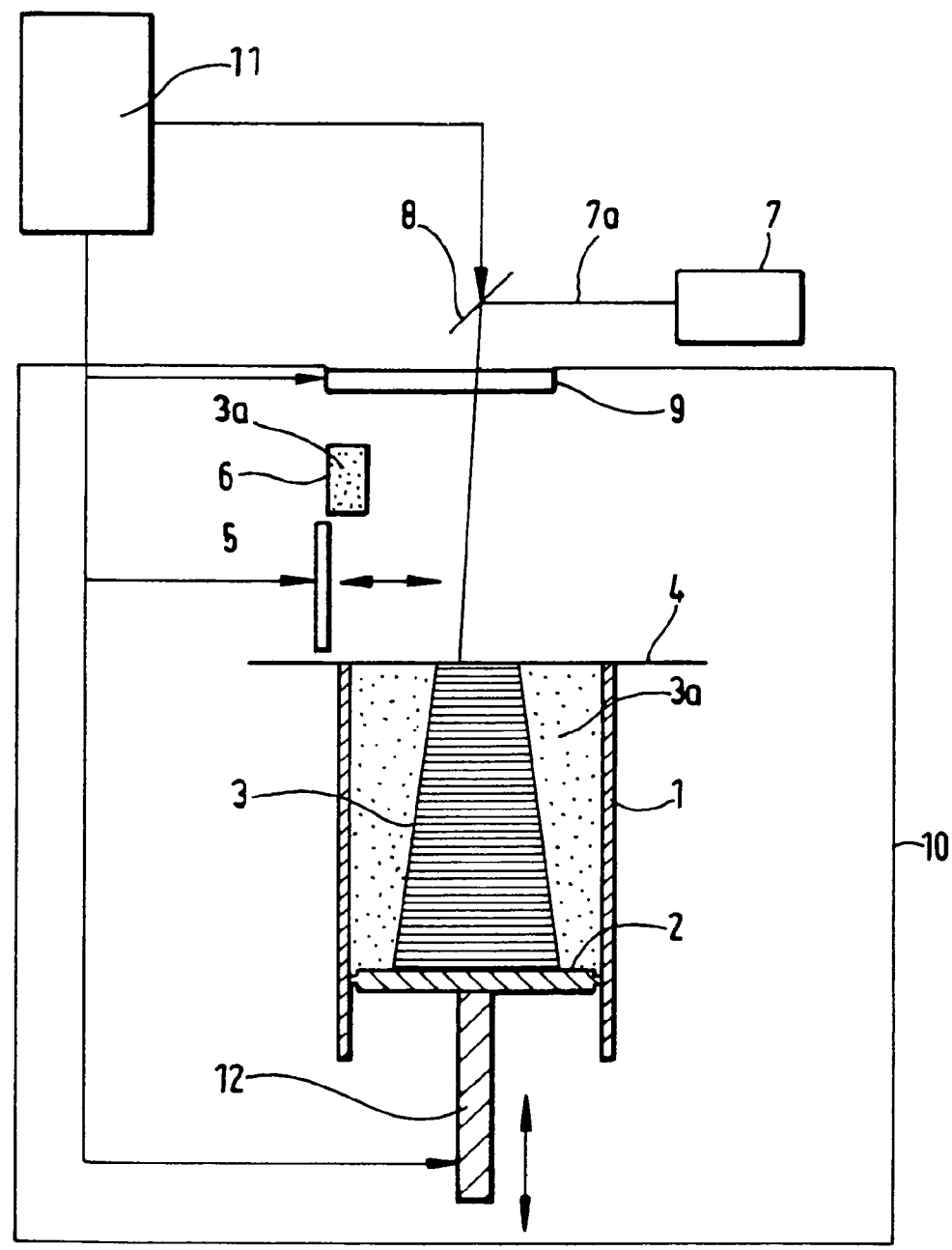

METHOD AND DEVICE FOR MANUFACTURING A THREE-DIMENSIONAL OBJECT THAT IS SUITABLE FOR APPLICATION TO MICROTECHNOLOGY

The present invention relates to a method and a device for manufacturing a three-dimensional object. The manufactured object is in particular suitable for application in the field of microtechnology.

EP 0 758 952 B1 describes a known method and device for manufacturing a three-dimensional object, where the object is generated by successive solidification of single layers of a liquid or powdery solidifiable building material by action of electromagnetic radiation. Here, the electromagnetic radiation is preferably a pulsed laser radiation. DE 100 28 063 A1 and DE 100 65 960 A1 show a similar device, where the electromagnetic radiation is a pulsed laser radiation.

DE 102 58 934 A1 describes a method and a device for selectively connecting bodies with supports by means of laser beams. A pulsed laser radiation is applied and the radiation pressure is used for compacting and additionally heating the powder layer. As described, the method is applicable to the generation of microstructures. The parts producible by the known method, in particular metal parts, however, have a residual porosity, for which reason they are not suitable for certain applications in the microtechnology field.

An object of the present invention is therefore to provide a method and a device for manufacturing a three-dimensional object that may, in turn, be utilized in the field of microtechnology.

This object is solved by the method for manufacturing a three-dimensional object, wherein the object is generated by successively solidifying of single layers of a liquid or powdery solidifiable building material by the action of electromagnetic radiation, wherein within a layer, a first pulsed electromagnetic radiation and a second pulsed electromagnetic radiation with a higher frequency than the first pulsed electromagnetic radiation or a continuous electromagnetic radiation is used.

The invention further provides a device for manufacturing a three-dimensional object in accord with the above described method.

Advantageous further developments are povided in the invention having one or more of the following features (wherein references to lead numbers refer to examples in the figures):

irradiating a first pulsed electromagnetic radiation (7a) onto a first area of a layer of the building material (3a); and irradiating a second pulsed or a continuous electromagnetic radiation (7a) onto a second area of the layer of the building material (3a);

the first radiation (7a) is a pulsed laser radiation;

the radiation (7a) is a pulsed or a continuous laser radiation;

the first area and the second area of the layer at least partially overlap;

the frequency of the first pulsed radiation is between approximately 60 and approximately 300 kHz;

the frequency of the second pulsed radiation is between approximately 200 and approximately 450 kHz;

between emitting of the first pulsed electromagnetic radiation (7a) onto the building material (3a) and emitting of the second pulsed or continuous electromagnetic radiation (7a) a time period is provided, during which the building material (3a) irradiated with the first pulsed lectromagnetic radiation (7a) solidifies;

within a layer locally and/or timely an alternation between the first and the second radiation is carried out;

an area of a layer that has been irradiated with the first pulsed radiation is subsequently additionally irradiated with the second pulsed or the continuous radiation;

laser sintering or laser melting is used;

a powder is used that has a grain size between approximately 1 nm and approximately 100 nm;

the layer thickness, in which the powder is applied, is between approximately 1 μm to approximately 100 μm;

the beam diameter is between 1 μm up to approximately 20 μm;

a single laser (7) is used that can emit both, a first pulsed laser radiation (7a) as well as a second pulsed or a continuous laser radiation (7a); and a first laser is provided that emits a pulsed laser radiation and a second laser is provided that emits a pulsed or a continuous laser radiation.

The method and device according to the present invention may be used suitably and advantageously in a micro laser sintering (micro-LS) process, by which three-dimensional objects, with a resolution in the range of micrometers, are built-up.

By such a method and device, three-dimensional components with enhanced density may be produced, and the mechanical properties of the manufactured component may be improved correspondingly.

Further features and advantages of the invention will become apparent from the description of embodiments by means of the accompanying drawings. In the drawings:

FIG. 1 shows a schematic view of a device for manufacturing a three-dimensional object according to one or more embodiments of the present invention.

Referring now to FIG. 1, a laser sintering device comprises a frame 1, which is open towards the top and has a platform 2 arranged therein that is movable in a vertical direction. The platform 2 is adapted to carry the three-dimensional object 3 to be manufactured. The frame 1 and the platform 2 define inside a building space. The platform 2 is connected to a lifting mechanism 12 that moves the platform 2 in a vertical direction so that the layer of the object 3 that is to be solidified is arranged in a working plane 4, respectively.

Furthermore, a coating device 5 for applying a layer of a powdery building material 3a is provided. Regarding the building material 3a, any laser-sinterable powder or powders may be used, such as polymers, for example, polyamide and/or polystyrene, metals, ceramics, compound materials and in particular high temperature plastics such as for example PAEK (polyaryletherketone). Regarding metal-containing powder material, any metals and their alloys, as well as blends with metallic components or with non-metallic components may be utilized. At first, the building material 3a is fed from a reservoir 6 to the frame 1. The coating device 5 is then moved to a predetermined height in the working plane 4, so that the layer of the powdery building material 3a lies with a defined height above the previously solidified layer. The device further comprises a laser 7 to generate a laser beam 7a, focused by means of a deflection device 8 to any points in the working plane 4. In so doing, the laser beam 7a can selectively solidify the powdery building material 3a at positions corresponding to the cross-section of the object 3 to be manufactured. Regarding lasers, any laser or lasers may be used that are suitable for laser sintering or laser melting of the corresponding building material, respectively, for example, $CO_2$-lasers, solid state lasers and others.

Reference numeral 10 refers to a process chamber, in which the frame 1, the platform 2, the lifting mechanism 12, and the coating device 5 can be arranged. Reference numeral 9 refers to an opening in the process chamber 10 for introducing the laser beam 7a. Preferably, a protective gas is introduced into the process chamber 10. Further, a control unit 11 is provided, through which the device is controlled in a coordinated manner for carrying out the building process.

The laser sintering device, in a preferred embodiment, may be a micro laser sintering device. Micro laser sintering is characterized in that very fine powders are used and very thin layers are applied. By means of micro laser sintering, a resolution in the range of 10-20 μm or less may be reached. The powders that are used have a grain size in the range of approximately 1 nm to approximately 100 nm. The grain size is measured using laser diffraction according to DIN ISO 13320-1. The layer thickness of the applied powder layers is approximately 1 μm up to a approximately 100 μm. Generally, for the micro laser sintering the grain size and the layer thickness are sized such that the surface forces are greater than the gravitational forces. The beam diameter used may be between approximately 1 μm up to approximately 20 μm. The laser may preferably be a fiber laser or a YAG-laser. Any suitable powder from materials that can be applied in the field of microtechnology may be used. In a preferred embodiment, a metal powder is used In operation of the device in a first step the platform 2 is moved by means of the lifting mechanism 12 until its uppermost side is located one layer thickness beneath the working surface 7. Then a first layer of the building material 3a is applied to the platform 2 via the reservoir 6 and the coating device 5, and the building material 3a is then leveled or evened-out. Thereafter, the control unit 11 controls the deflection device 8 so that the deflected laser beam 7a selectively hits the positions of the layer of the building material 3a to be solidified. Thereby, at these positions the building material 3a is solidified or sintered such that the three-dimensional object 3 is generated.

In a subsequent step the platform 2 is lowered by the lifting mechanism 12 by one layer thickness (the thickness of one layer of building material 3a to be sequentially sintered). By means of the reservoir 6 and the coating device 5, a second layer of building material is applied, evened and selectively solidified by means of the laser beam 7a. These steps are repeated until the desired object 3 is manufactured.

By means of the method and device according to the embodiments of the present invention, the laser 7 is controlled by means of the control unit 11 in two different operating modes. The first operating mode causes a first pulsed radiation 7a of the laser 7 with a first frequency. The second mode of operation causes a second radiation, that is a pulsed radiation with a higher frequency compared to the first pulsed radiation, or is a continuous radiation. The frequency of the first pulsed radiation may be, for example between 60 kHz and 450 kHz, preferably approximately 60 kHz to 300 kHz. The frequency of the second pulse radiation may be, for example, between 200 kHz and 450 kHz.

The pulsed laser radiation 7a can be generated by pulsed excitation or also by measures within the laser 7 itself (Q-switching or mode coupling). With the pulsed laser radiation the laser beam 7a is not emitted continuously as with a CW-laser (continuous wave laser), but is emitted in a pulsed manner, i.e. in timely limited pulses.

Preferably, a laser 7 is used that can emit both, a pulsed radiation 7a as well as a continuous radiation 7a. For the latter, a CW-laser is operated in a pulsed manner by switching on and off the "pumping power" in short cycles. Carbon dioxide laser can be operated in this way, and can be pushed up to more than 1 kHz. In another embodiment, is the generation of the pulses is by a combination of a CW-laser and a modulator, such as, for example, a simple chopper.

After the coating device 5 has applied and evened a layer of the building material 3a, the irradiation of the layer of the building material 3a is effected in two steps. First, a first pulsed electromagnetic radiation 7a is irradiated onto a first area of a layer of the building material, and subsequently a second pulsed radiation or a continuous electromagnetic radiation 7a is irradiated onto a second area of the layer of the building material 3a.

Preferably, the first and the second area of the layer overlap at least partially. The areas may also fully overlap and can represent partial areas of one layer or the whole layer. Further preferably, a time period is provided between the irradiation of the first pulsed electromagnetic radiation 7a onto the building material 3a and the irradiation of the second pulsed or continuous electromagnetic radiation 7a onto the building material 3a, during which the building material 3a irradiated with the first pulsed electromagnetic radiation 7a solidifies.

The combination of the first pulsed radiation and the second pulsed radiation or the continuous radiation 7a has a synergistic effect. First, the first pulsed radiation 7a causes the break-up of the surface tensions of the powder particles in the building material 3a and the bonding of the powder grains. Second, the second pulsed or continuous radiation 7a causes a further compaction of porous sintering structures in the building material 3a that has already been irradiated with the first pulsed electromagnetic radiation 7a. Thus, with the second radiation the forming of melting beads is prevented.

In a an alternate embodiment, through a timely alternation, a first area of a layer can be irradiated with the first pulsed radiation and subsequently a second area of the layer that does not overlap the first area can be irradiated with the second continuous radiation. A plurality of first and second areas may thus be provided.

By the division of the layers in first and second areas that are irradiated in a pulsed manner or continuously and that overlap fully, partially or don't overlap at all, the energy or heat input into the layer can be controlled and harmonized advantageously so that stresses in the layer can be reduced.

The method according to the embodiments of the present invention, and the corresponding device, are advantageously suitable for micro laser sintering (micro-LS), wherein three-dimensional objects having details in the range of micrometers, are built-up.

The scope of the invention is not limited to the embodiments described herein but includes other equivalents and modifications as far as they fall into the scope defined by the attached claims.

The present invention is not only suitable for a laser sintering method, but also for a laser melting method, as well as stereolithography.

Additionally, as an alternative to using laser radiation as electromagnetic radiation, a particle radiation, such as for example, electron radiation, may be used.

Furthermore, instead of a single laser, two or more laser light sources may be used.

The invention claimed is:

1. A method for manufacturing a three-dimensional object, comprising generating the object by successively solidifying single layers of a liquid or powdery solidifiable building material by the action of an electromagnetic radiation, wherein within a layer, a first pulsed electromagnetic radiation and a second pulsed electromagnetic radiation with a higher frequency than the first pulsed electromagnetic radiation or a continuous electromagnetic radiation is used, wherein between emitting of the first pulsed electromagnetic radiation onto the building material and emitting of the second pulsed or continuous electromagnetic radiation a time period is provided, during which the building material irradiated with the first pulsed electromagnetic radiation is allowed to solidify.

2. The method of claim 1, further comprising:
irradiating a first pulsed electromagnetic radiation onto a first area of a layer of the building material; and
irradiating a second pulsed or a continuous electromagnetic radiation onto a second area of the layer of the building material.

3. The method of claim 1, wherein the first radiation is a pulsed laser radiation.

4. The method of claim 1, wherein the radiation is a pulsed or a continuous laser radiation.

5. The method of claim 2, wherein the first area and the second area of the layer at least partially overlap.

6. The method of claim 1, wherein the frequency of the first pulsed radiation is approximately 60-300 kHz.

7. The method of claim 1, wherein the frequency of the second pulsed radiation is approximately 200-450 kHz.

8. The method of claim 1, wherein, within a layer, an alternation between the first and the second radiation is carried out, based on location and/or time.

9. The method of claim 1, wherein an area of a layer that has been irradiated with the first pulsed radiation is subsequently additionally irradiated with the second pulsed or the continuous radiation.

10. The method of claim 1, further comprising laser sintering or laser melting.

11. The method of claim 1, wherein a powder is used that has a grain size of approximately 1-100 nm.

12. The method of claim 1, wherein the layer thickness, in which the powder is applied, is approximately 1-100 μm.

13. The method of claim 1, wherein the beam diameter is approximately 1-20 μm.

14. A method for manufacturing a three-dimensional object, comprising generating the object by successively solidifying single layers of a liquid or powdery solidifiable building material by the action of an electromagnetic radiation, wherein within a layer, a first pulsed electromagnetic radiation and a second pulsed electromagnetic radiation with a higher frequency than the first pulsed electromagnetic radiation is used,
wherein the frequency of the second pulsed radiation is approximately 200-450 kHz.

\* \* \* \* \*